United States Patent [19]
Wilson

[11] Patent Number: 4,792,297
[45] Date of Patent: Dec. 20, 1988

[54] INJECTION MOLDING APPARATUS

[76] Inventor: Jerome L. Wilson, 24 Spring St., Endicott, N.Y. 13760

[21] Appl. No.: 101,746

[22] Filed: Sep. 28, 1987

[51] Int. Cl.⁴ .............................................. B29C 45/36
[52] U.S. Cl. ................................ 425/192 R; 164/303; 264/328.7; 425/577; 425/589
[58] Field of Search ............... 425/192 R, 589, 547, 425/577, 438, 450.1, 588, DIG. 247, 185, 186; 264/328.7; 249/204, 105; 164/484, 137, 344, 303

[56] References Cited

U.S. PATENT DOCUMENTS

| | | | |
|---|---|---|---|
| 2,415,961 | 2/1947 | Nast | 425/577 X |
| 2,698,460 | 1/1955 | Amo | 425/547 X |
| 2,808,627 | 10/1957 | Venus | 425/589 X |
| 3,647,338 | 3/1972 | Ise | 425/588 X |
| 3,659,997 | 5/1972 | Rees | 425/589 X |
| 3,914,081 | 10/1975 | Aoki | 425/589 X |
| 3,986,805 | 10/1976 | Haines | 425/450.1 X |
| 3,995,677 | 12/1976 | Campbell | 249/204 X |
| 4,012,827 | 3/1977 | Abrams | 425/589 X |
| 4,062,395 | 12/1977 | Sirmay | 264/275 X |
| 4,105,385 | 8/1978 | Hehl | 425/192 R |
| 4,120,635 | 10/1978 | Langecker | 425/451.9 X |
| 4,285,659 | 8/1981 | Koike | 425/547 |
| 4,345,965 | 8/1982 | Lindenmayer et al. | 425/589 X |

Primary Examiner—Richard L. Chiesa
Attorney, Agent, or Firm—Wall and Roehrig

[57] ABSTRACT

An injection molding machine that includes a base assembly having separable mold halves in which at least one removable liner is contained between the opposed surfaces of the mold halves. The liner has a molding cavity formed therein. When the assembly is closed, the liner is clamped between the mold halves and molten material is delivered into the cavity through the existing sprue system to fill the cavity. Opening the mold permits the liner to be removed and the part is separated therefrom from the liner.

13 Claims, 3 Drawing Sheets

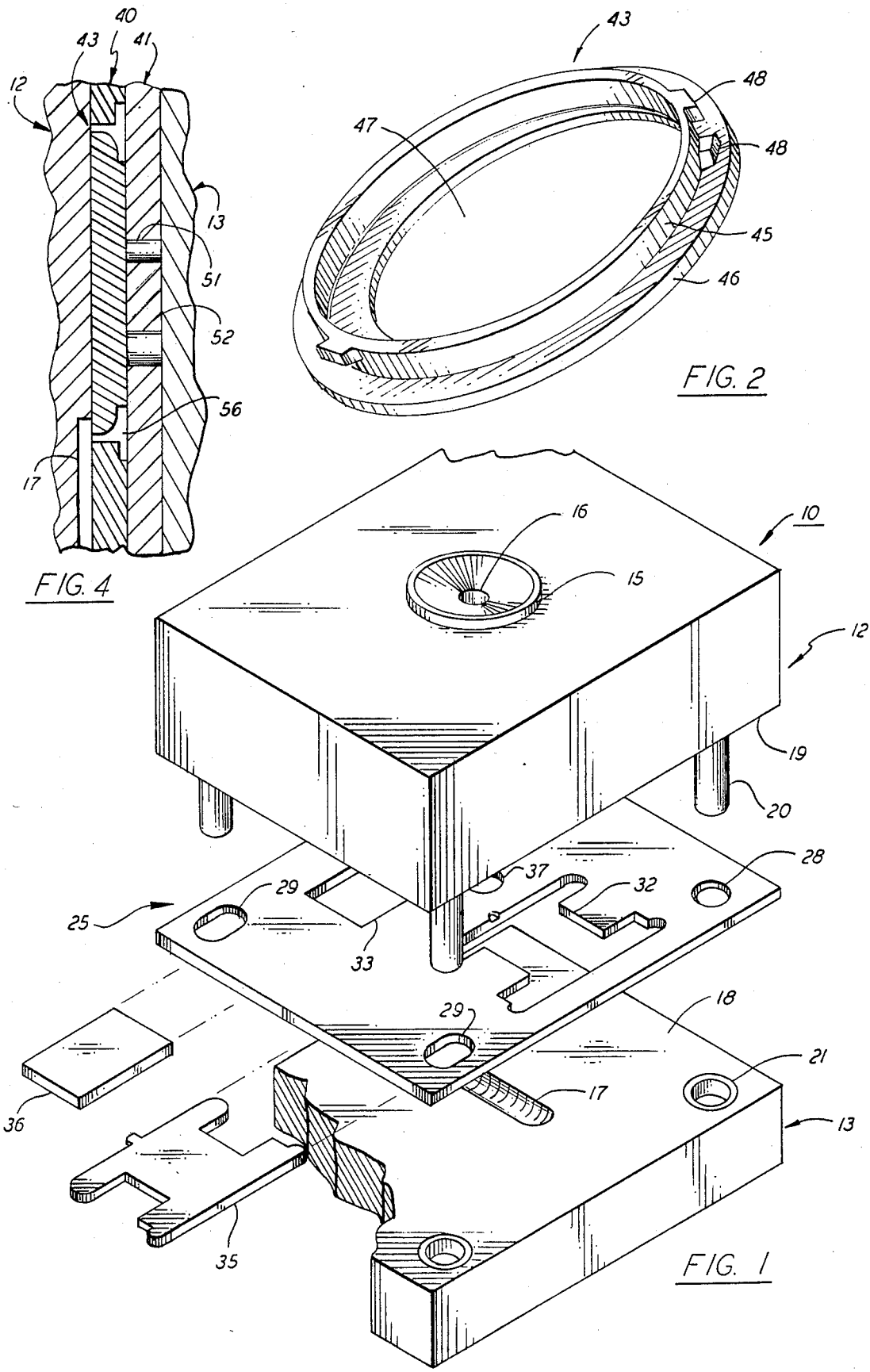

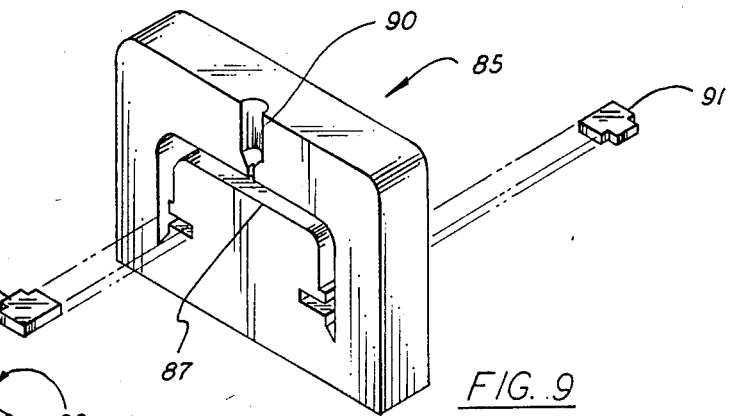
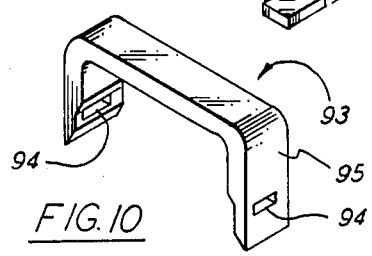
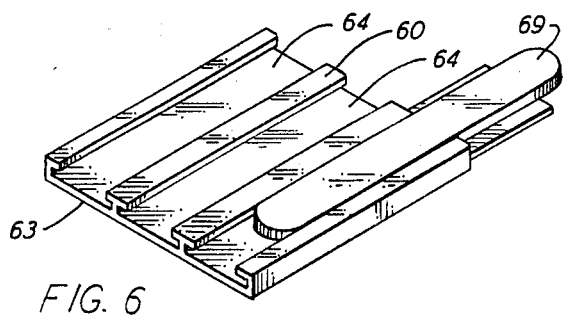
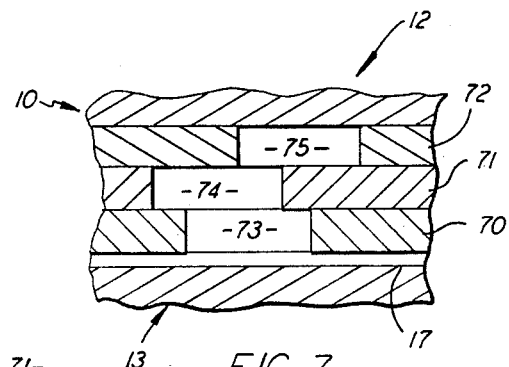
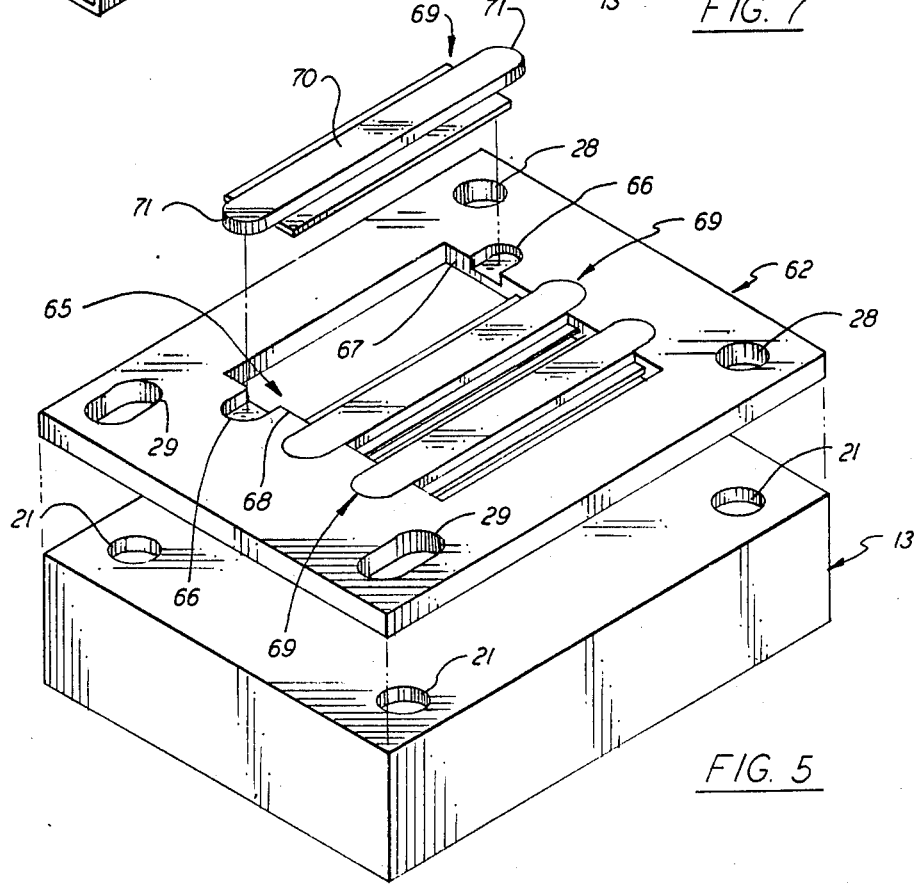

INJECTION MOLDING APPARATUS

BACKGROUND OF THE INVENTION

This invention relates to injection molding apparatus and, in particular, to an injection molding machine having a removable liner or liners positioned between the clamping and support plates of a mold base assembly to permit economic molding of a limited number of parts.

As is well known in the injection molding art, a mold base having two separable halves is typically mounted in an automatic machine which, among other things, delivers a molten material to the base assembly. The material typically is plastic but can be metal. The base assembly generally includes a clamping plate and an opposing support plate that are moved by actuators between an open and a closed position. A molding cavity is cut or otherwise formed in the opposing surfaces of the two plates which replicates the part to be molded.

When molding a part, the mold is closed and the molten material is delivered to the mold cavity by a sprue system to fill the cavity. The base assembly is typically provided with a cooling system which rapidly cools the part so that it can be removed from the assembly. Upon cooling, the assembly is opened and ejector pins brought into contact with the part to remove it from the mold cavity.

It has heretofore been the practice in the art to have a highly-skilled mold maker cut the mold cavity in one or both opposing plate surfaces of the base assembly. This typically is a time consuming and expensive procedure which renders the base assembly unusable except in the manufacture of a specific part or parts. When the part is discontinued or no longer needed, the entire base assembly is usually scrapped. As a consequence, it has been found uneconomical to injection mold parts where the quantity required is relatively small.

The lead time required to produce a finished base assembly that is ready for use in a molding machine is also relatively long. Lead times are generally in the nature of weeks and even months. Only those who mass produce the parts over a long period of time can afford this kind of delay. Others, however, usually adopt more costly but faster fabricating methods.

SUMMARY OF THE INVENTION

It is therefore an object of the present invention to improve injection molding apparatus.

It is a further object of the present invention to improve an injection molding device so that a limited number of parts can be economically made within an injection molding machine.

Yet another object of the present invention is to provide a removable liner for a base assembly that has a molding cavity formed therein and which is positionable between the clamping plate and support plate of the mold assembly whereby the assembly can be quickly adapted to mold different parts by simply replacing the liner.

Yet another object of the present invention is to reduce the cost of die molding equipment used in injection molding machines.

Another object of the present invention is to provide a base assembly for use in an injection molding machine that can be reused to manufacture an infinite number of different parts.

A still further object of the present invention is to reduce the amount of lead time required to adapt a base assembly for use in molding a part or parts.

These and other objects of the present invention are attained in an injection molding machine that includes a mold base assembly having a clamping plate and a support plate that are movable between an open position and a closed position. A sprue hole is provided in the one plate for feeding molten material into the molding assembly. Guide pins anchored in one of the plates are slidably received in bushings contained in the opposing plate to align the assembly as it is moved between an open and a closed position. At least one flat removable molding liner is mounted within the assembly between the opposing surfaces of the plates. The liner has top and bottom surfaces that are flat and parallel so that the liner is securely clamped between the plates when the assembly is closed. A contoured molding cavity is formed within the liner that replicates the part or parts to be molded. Indexing holes are also formed in the liner to receive the guide pin and thus register the liner between the plates. Runner means formed in one of the cooperating plates communicate with a sprue hole to deliver molten material into the mold cavity of the liner.

In one embodiment of the invention, a series of liners are mounted in registration one over the other on the guide pins. Each liner has a separate cavity that communicates with a cavity formed in an adjacent liner whereby the cavities combine to replicate a relatively complex part. Cores are also mounted by various means within the liner cavities to permit greater latitude in the type of part that can be molded.

In a still further embodiment of the invention, a modular unit die assembly is adapted to slidably receive a molding liner therein. The liner again has the profile of a part to be molded or formed therein and can accept a core or cores to again permit the molding of relatively complex parts.

In all embodiments of the invention, the liner or liners are removable from the base assembly so that the assembly can be reused to mold other parts.

BRIEF DESCRIPTION OF THE DRAWINGS

For a better understanding of these and other objects of the present invention, reference is made to the following detailed description of the invention which is to be read in conjunction with the accompanying drawings wherein:

FIG. 1 is an exploded view showing a liner embodying the teachings of the present invention positioned between the clamping and supporting plates of a base assembly;

FIG. 2 is a perspective view of a molded part fabricated by use of the present invention;

FIG. 4 is an enlarged sectional view taken along lines 4—4 in FIG. 3 showing a core mounted in one of the liners;

FIG. 5 is a perspective view showing another embodiment of the invention wherein cores are suspended within the molding cavity of a liner;

FIG. 6 is a perspective view of the part molded in the liner shown in FIG. 5;

FIG. 7 is an enlarged side elevation in section showing a plurality of liners stacked in superposition between the support plate and the clamping plate of the base assembly;

FIG. 9 is an enlarged perspective view showing a liner that is insertable within the assembly shown in FIG. 8;

FIG. 10 is a perspective view of a part molded in the liner shown in FIG. 9.

DESCRIPTION OF THE INVENTION

Figure 8:
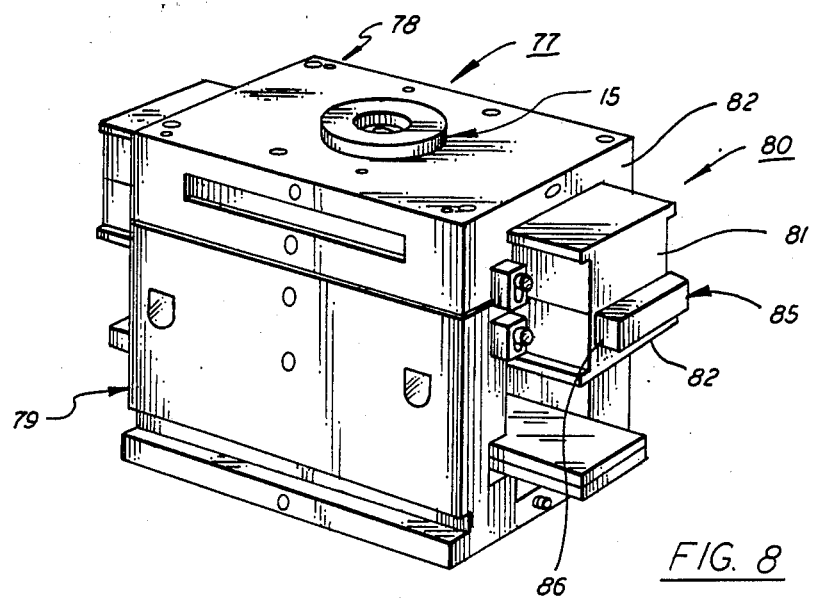
FIG. 8 is a perspective view showing the construction of a master unit die assembly that has been adapted to accept a liner embodying the present invention.

Referring now to the drawings and, in particular, to FIG. 1, there is illustrated a base assembly generally referenced 10 having a top clamping plate 12 and a bottom support plate 13. The base assembly is adapted to be mounted within a suitable automatic injection molding machine of well known design. Although not shown, the molding machine typically includes a nozzle that mates with the sprue bushing 15 located in the top of the clamping plate for injecting a molten material, such as plastic, into the base assembly. The molten material is conveyed by a sprue passage 16 into a runner 17 machined in the top surface 18 of the support plate. As will be explained in greater detail below, the runner is adapted to carry the molten material to one or more molding cavities formed in a removable liner 25.

The injection molding machine also includes actuators that are adapted to engage each half of the base assembly to move the opposing plates linearly towards and away from each other between an open and a closed position. The opposing surfaces 18 and 19 of the two plates are machined flat and parallel to provide for a tight, positive clamping action when the base assembly is closed. Guide pins 20—20 are anchored in the clamping plate and are arranged to extend downwardly towards the top surface of the support plate. Bushing 21—21, which are located in the support plate in axial alignment with the pins, are adapted to slidably receive the guide pins and index the plates as they are moved between the open and the closed positions.

A flat liner 25, embodying the teachings of the present invention, is mounted between the opposing surfaces 18 and 19 of the base assembly parts. The liner has top add bottom surfaces, 26 and 27, respectively, that are machined flat and parallel so that the liner is tightly clamped between the opposing surfaces of the base assembly when the plates are closed thereagainst. The liner includes at least two indexing holes, such as hole 28, that provide a close running fit with two of the guide pins to register the liner between the plates of the base assembly when the base assembly is brought into a closed position. A pair of slotted holes 29—29 are also provided in the liner which allow the remaining pins to pass freely therethrough. It should be noted that when the base assembly is brought to a fully opened position, the pins are retracted from the holes formed in the liner and the liner can thus be easily removed from the assembly.

As illustrated in FIG. 1, one or more molding cavities can be formed in the liner with the cavities replicating or outlining a part or parts to be manufactured. In this embodiment, two molding cavities 32 and 33 are formed in the liner and are adapted to produce two different parts 35 and 36. A hole 37 is passed through the liner which permits the molten material injected into the base assembly to flow from the sprue passage 16 into the horizontal runner 17. As seen in FIG. 1, the runner, in turn, is arranged to bring the molten metal into both of the mold cavities 32 and 33.

In practice, the liner may be fabricated from a sheet of rolled, low carbon steel. The top and bottom surfaces of the liner are ground so that the two surfaces are both flat and parallel. The molding cavities formed in the liner are accurately cut using the well known electrical wire discharge cutting technique. Commercially available machines utilizing this technique can be accurately programmed to cut almost any desired contour within very close tolerances. Accordingly, the liner can be fabricated by a machinist rather than a mold maker thereby considerably reducing the overall cost of the mold assembly. The liner can therefore be economically manufactured within a very short period of time and thus afford a manufacturer the ability to economically produce limited quantities of molded parts. Molded pats that heretofore required a lead time of weeks and sometimes months can now be delivered to a customer in a matter of days.

Figure 3:
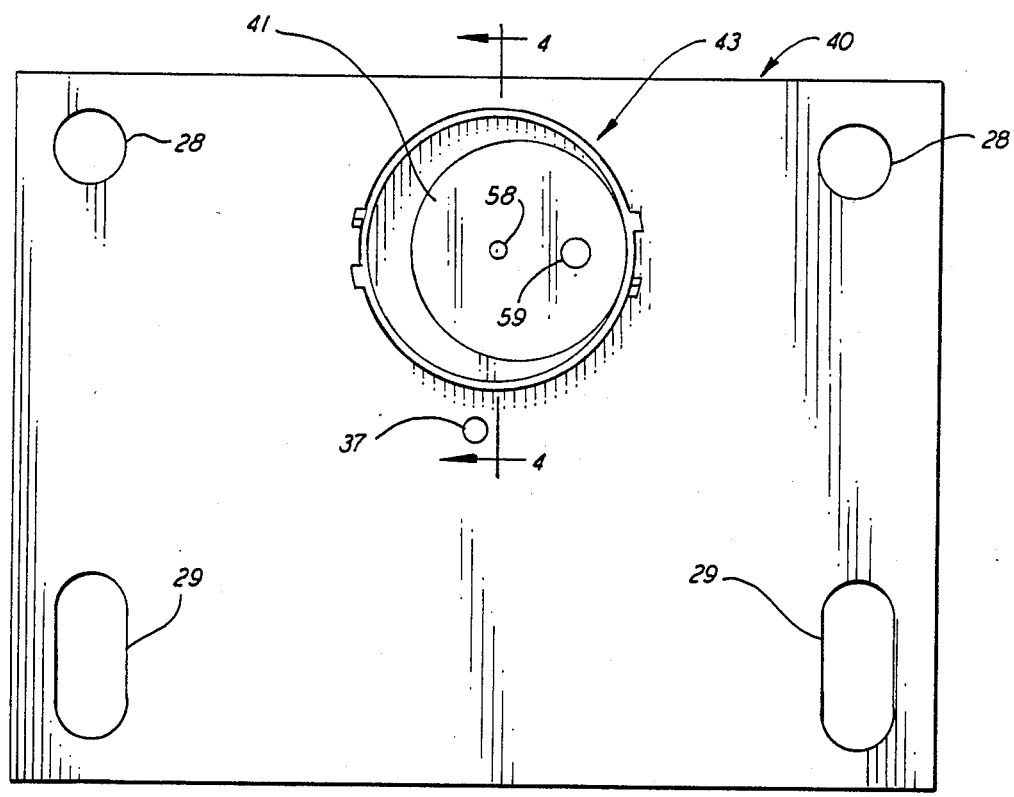
FIG. 3 is a top view showing a pair of superimposed liners used to injection mold the part shown in FIG. 2.

Turning now to FIGS. 2, 3 and 4, there is shown another embodiment of the present invention wherein a pair of liners 40 and 41 (FIG. 4) are mounted in superposition between plates 12 and 13 of the base assembly. This stacked arrangement of liners permits the molding of a part 43 (FIG. 2) having a relatively complex geometry. The part, in this case, has a cylindrical body 45 which is attached to a radially extended flange 46 containing a non-symmetrical hole 47. Tabs 48—48 are randomly extended about the body of the part. Ordinarily, preparing a conventional base assembly to produce this type of part is a relatively time consuming and expensive task.

The bottom liner 41 of the stack contains a removable core that is secured in the liner by a locating pin 51 and a supporting dowel 52 (FIG. 4). The top liner 40 contains a cut-out 55 that faithfully depicts the outer periphery of the molded part 43. When the two liners are brought together in assembly, the cut-out and the core combine to form a molding cavity 56 that faithfully replicates the part to be molded. As noted above, the plates are mounted within the base assembly and indexed into registration between the guide pins. The base assembly is then closed to clamp the liners securely between the mold halves. The molding cavity is filled with molten material in the same manner as described above to complete the molding process.

Once the part has been molded, the liner stack is removed from the mold. The first step in separating the part from the stack is to remove the core through the top liner. FIG. 3 is a top view looking down upon liner 40. In this view, the core has been removed from the bottom liner exposing the receiving holes 58 and 59 for the core locating pin and supporting dowel. The part 43 is illustrated seated within the top liner 40. The two liners are now separated and the part is pushed out of the top liner through the bottom opening formed in the molding cavity. The liners and core can then be reassembled and replaced in the base assembly and a new part molded as explained above.

FIGS. 5 and 6 show still another embodiment of the present invention wherein a complex part 60 is molded within a single liner 62. In this particular application, the part contains a base 63 and a number of parallel t-shaped, slotted openings 64—64 formed over the base. The outline of the part is again cut into the liner to form a cavity 65. A series of semi-circular recesses 66—66 are spaced along the top of the liner in opposing side walls 67 and 68 of the molding cavity. The opposing recesses are placed in axial alignment and are adapted to receive therein hanging core units 69—69. Each core unit contains an elongated hanger 70. The ends 71—71 of each hanger is semicircular shaped to complement the recesses 66—66 formed in the top of the liner so that the hanger fits snugly within a pair of opposing recesses as shown in FIG. 5. A laterally extended flat member 72 is attached to the underside of each hanger which, in assembly, is suspended from the hanger within the molding cavity. Each core unit describes one of the t-slots to be formed in the final part. The core units are hung in the liner as shown and the liner is then clamped within the base assembly and the core cavity filled with molten material to mold the part. After cooling, the base assembly is opened and the liner removed. The part, along with the hanging core units, are separated from the liner and the core units are slidably removed from the part as illustrated in FIG. 6.

FIG. 7 shows a plurality of liners 70, 71 and 72 clamped between the clamping plate 12 and support plate 13 of a base assembly 10. Each liner has an independent cavity 73-75 cut therein. When registered between the guide pins of the base assembly, the liner cavities are all in fluid communication with one another. Molten material is conducted by runner 17 to the lower cavity 73 and distributed to the other two cavities to entirely fill the molding cavity region. After the part is molded, the liner stack is removed from the base assembly, and the liners are separated one after another to free the part. As can be seen, a relatively complex shaped part can be quickly and economically molded using this stacking technique.

FIG. 8 shows a base assembly 77 that has been modified to accept a modular unit die 80 which is sometimes referred to simply as a MUD unit. The MUD unit is positioned between the two opposing halves of the base assembly and is typically used in the art to manufacture relatively small parts. The clamping plate 81 and the support plate 82 of the MUD unit are attached to the separable upper and lower halves 78 and 7 of the base assembly. The clamping and support plates are thus arranged to open and close with the mold halves as they are cycled by the actuator mechanism of the injection molding machine (not shown). The clamping and support plates of the MUD generally protrude from one side wall 82 of the base assembly.

The MUD unit 80 has been modified to slidably receive therein a liner 85 which is illustrated in greater detail in FIG. 9. A rectangular chamber 86 is machined in the support plate of the MUD unit so that the bottom surface of the clamping plate forms the top wall of the chamber. The liner 85 is slipped into the chamber when the base assembly is in an open position and securely clamped between the plates when the assembly is closed.

As illustrated in FIG. 9, the liner 85 has a molding cavity 87 machined therein which replicates the outline of the part to be molded. Here again, the cavity can be formed accurately and quickly using the note wire electrical discharge technique. A runner 90 is machined in the liner that is arranged to conduct molten material from the sprue system of the MUD unit into the molding cavity. A pair of core members 91—91 are slidably mounted within the block to complete the outline of the part 93 illustrated in FIG. 10. The core members, in this embodiment, form rectangular openings 94—94 found in the opposing legs 95—95 of the part.

Once the part has been molded in the MUD unit, the base assembly is opened and the liner is slidably removed from the chamber. The part, along with the core members, is separated from the liner and the core pieces removed from the part. To mold another part, the core pieces are simply replaced in the liner and the liner inserted back into the MUD unit.

As should be evident to one skilled in the art, through the use of the present invention, limited quantities of molded parts can be economically fabricated using injection molding techniques. It should also be noted that because of the ease of manufacture of the liners, the lead time for producing parts is extremely short. Parts that heretofore have taken months to produce can now be produced within a matter of days. The manufacturing costs of the liners, as described above, is relatively inexpensive. The liners, because they can be replaced within the base assemblies, allow a single base assembly to be used over and over in the injection molding process to make different parts. Accordingly, a considerable saving is realized by using the manufacturing technique of the present invention.

While this invention has been described in detail with respect to certain preferred embodiments, it should be recognized that the invention is not limited to those embodiments. Rather, many variations and modifications of these would be apparent to those of skill in the art, without departing from the scope and spirit of the invention, as defined in the appended claims.

What is claimed is:

1. In an injection mold having a stationary member and a movable member that are arranged to move between an open and a closed position and sprue means for feeding molten material between said members, the improvement comprising at least one flat plate having parallelly disposed top and bottom surfaces, said plate being insertable between the mold members when said members are in an open position, said plate having a contoured part defining hole passing through its top and bottom surfaces for receiving molten material therein said hole outlines a part to be molded, supporting means attached to one of the mold members for removably suspending the plate between the mold members and permitting the members to close against said plate to close both sides of the part defining hole whereby molten metal can be fed into said part defining hole to form said part.

2. The injection mold of claim 1 that includes a series of flat plates mounted in superposition upon said supporting means, each plate having a part defining hole passing through its top and bottom surfaces so that the part defining hole in one plate communicates with the part defining hole in an adjacent plate whereby molten material from said sprue means flows from one part defining hole into another.

3. The injection mold of claim 1 that further includes hanger means mounted in a recess formed in the said at least one plate on either side of the part defining hole and a core means suspended from said hanger means that is positioned within said part defining hole.

4. The injection mold of claim 1 that further includes a second plate mounted on said support means in superposition with said at least one plate and a core means mounted on said second plate that passes into the part defining hole of said other plate.

5. The injection mold of claim 1 wherein said at least one plate has a plurality of part defining holes formed therein that are arranged to communicate with said sprue means whereby a plurality of parts are molded in said plate simultaneously.

6. The injection mold of claim 1 wherein said sprue means further includes a runner means for moving molten metal laterally along said at least one plate into the part defining hole.

7. The injection mold of claim 6 wherein said runner means is formed in the plate.

8. The injection mold of claim 1 wherein the walls of the part defining hole are perpendicular with respect to the top and bottom surfaces of the plate.

9. The injection mold of claim 1 wherein said supporting means are guide pins that are affixed to one member and are insertable into the other member as the members move from an open to closed position.

10. In an injection mold having opposing members that are movable between an open and closed position and a modular unit mounted between said members that has opposed top and bottom plates that open and close with said mold members and a sprue means for bringing molten material between the plates, the improvement comprising an open sided chamber formed between the opposing plates of the modular unit, a removable flat molding block that is insertable into the chamber between the plates when the mold is open and being clamped between the plates when the mold is closed, a contoured part defining hole formed in the block that passes through the top and bottom surfaces of said block and communicates with said sprue means , said hole outlines a part to be molded, whereby the part defining hole, is closed against said plates when the mold is closed and is fed with said molten material to form said part.

11. The injection mold of claim 10 wherein the block further includes core means slidably mounted in recesses formed in said block adjacent the part defining hole.

12. The injection mold of claim 10 that further includes runner mans for conducting molten material from the sprue means into the part defining hole.

13. The injection mold of claim 10 wherein the part defining hole formed in the block has sidewalls that are perpendicular with the top and bottom walls of said block.

* * * * *